US009298905B1

(12) United States Patent
Giobbi

(10) Patent No.: US 9,298,905 B1
(45) Date of Patent: *Mar. 29, 2016

(54) BIOMETRIC PERSONAL DATA KEY (PDK) AUTHENTICATION

(71) Applicant: Proxense, LLC, Bend, OR (US)

(72) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,982

(22) Filed: Oct. 23, 2014

Related U.S. Application Data

(63) Continuation of application No. 13/710,109, filed on Dec. 10, 2012, now Pat. No. 8,886,954, which is a continuation of application No. 11/314,199, filed on Dec. 20, 2005, now Pat. No. 8,352,730.

(60) Provisional application No. 60/652,765, filed on Feb. 14, 2005, provisional application No. 60/637,538, filed on Dec. 20, 2004.

(51) Int. Cl.
*G06F 21/35* (2013.01)
*G06F 21/32* (2013.01)

(52) U.S. Cl.
CPC ............... *G06F 21/35* (2013.01); *G06F 21/32* (2013.01)

(58) Field of Classification Search
CPC combination set(s) only.
See application file for complete search history.

(56) References Cited

U.S. PATENT DOCUMENTS

| | | |
|---|---|---|
| 4,759,060 A | 7/1988 | Hayashi et al. |
| 4,993,068 A | 2/1991 | Piosenka et al. |
| 5,187,352 A | 2/1993 | Blair et al. |
| 5,296,641 A | 3/1994 | Stelzl |
| 5,392,433 A | 2/1995 | Hammersley et al. |

(Continued)

FOREIGN PATENT DOCUMENTS

| | | |
|---|---|---|
| WO | WO 00/62505 | 10/2000 |
| WO | WO 01/22724 | 3/2001 |

(Continued)

OTHER PUBLICATIONS

"Alliance Activities: Publications: Identity—Smart Card Alliance," Smart Card Alliance, 1997-2007, Retrieved on Jan. 7, 2007 from <URL:http://www.smartcardalliance.org/pages/publications-identity>, 3 pgs.

(Continued)

*Primary Examiner* — Taghi Arani
*Assistant Examiner* — Phy Anh Vu
(74) *Attorney, Agent, or Firm* — Patent Law Works LLP

(57) ABSTRACT

Systems and methods verifying a user during authentication of an integrated device. In one embodiment, the system includes an integrated device and an authentication unit. The integrated device stores biometric data of a user and a plurality of codes and other data values comprising a device ID code uniquely identifying the integrated device and a secret decryption value in a tamper proof format, and when scan data is verified by comparing the scan data to the biometric data, wirelessly sends one or more codes and other data values including the device ID code. The authentication unit receives and sends the one or more codes and the other data values to an agent for authentication, and receives an access message from the agent indicating that the agent successfully authenticated the one or more codes and other data values and allows the user to access an application.

18 Claims, 6 Drawing Sheets

(56) References Cited

U.S. PATENT DOCUMENTS

| | | |
|---|---|---|
| 5,416,780 A | 5/1995 | Patel |
| 5,422,632 A | 6/1995 | Bucholtz et al. |
| 5,450,489 A | 9/1995 | Ostrover et al. |
| 5,619,251 A | 4/1997 | Kuroiwa et al. |
| 5,629,980 A | 5/1997 | Stefik et al. |
| 5,644,354 A | 7/1997 | Thompson et al. |
| 5,666,412 A | 9/1997 | Handelman et al. |
| 5,784,464 A | 7/1998 | Akiyama et al. |
| 5,825,876 A | 10/1998 | Peterson, Jr. |
| 5,857,020 A | 1/1999 | Peterson, Jr. |
| 5,892,825 A | 4/1999 | Mages et al. |
| 5,894,551 A | 4/1999 | Huggins et al. |
| 5,898,880 A | 4/1999 | Ryu |
| 5,917,913 A | 6/1999 | Wang |
| 5,928,327 A | 7/1999 | Wang et al. |
| 5,991,399 A | 11/1999 | Graunke et al. |
| 5,991,749 A | 11/1999 | Morril, Jr. |
| 6,016,476 A | 1/2000 | Maes et al. |
| 6,018,739 A | 1/2000 | McCoy et al. |
| 6,035,038 A | 3/2000 | Campinos et al. |
| 6,035,329 A | 3/2000 | Mages et al. |
| 6,038,334 A | 3/2000 | Hamid |
| 6,041,410 A * | 3/2000 | Hsu et al. .................. 713/186 |
| 6,042,006 A | 3/2000 | Van Tilburg et al. |
| 6,055,314 A | 4/2000 | Spies et al. |
| 6,070,796 A | 6/2000 | Sirbu |
| 6,088,730 A | 7/2000 | Kato et al. |
| 6,104,334 A | 8/2000 | Allport |
| 6,121,544 A | 9/2000 | Petsinger |
| 6,148,142 A | 11/2000 | Anderson |
| 6,161,179 A | 12/2000 | Seidel |
| 6,185,316 B1 | 2/2001 | Buffam |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,247,130 B1 | 6/2001 | Fritsch |
| 6,256,737 B1 * | 7/2001 | Bianco .................. G07C 9/00158 713/186 |
| 6,266,415 B1 | 7/2001 | Campinos et al. |
| 6,295,057 B1 | 9/2001 | Rosin et al. |
| 6,336,121 B1 | 1/2002 | Lyson et al. |
| 6,336,142 B1 | 1/2002 | Kato et al. |
| 6,363,485 B1 | 3/2002 | Adams et al. |
| 6,367,019 B1 | 4/2002 | Ansell et al. |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,715 B1 | 7/2002 | Saito |
| 6,425,084 B1 | 7/2002 | Rallis et al. |
| 6,434,535 B1 | 8/2002 | Kupka et al. |
| 6,446,130 B1 | 9/2002 | Grapes |
| 6,463,534 B1 | 10/2002 | Geiger et al. |
| 6,480,188 B1 | 11/2002 | Horsley |
| 6,490,443 B1 | 12/2002 | Freeny, Jr. |
| 6,510,350 B1 | 1/2003 | Steen, III et al. |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,805 B1 | 5/2003 | Ma et al. |
| 6,564,380 B1 | 5/2003 | Murphy |
| 6,628,302 B2 | 9/2003 | White et al. |
| 6,632,992 B2 | 10/2003 | Hasegawa |
| 6,647,417 B1 | 11/2003 | Hunter et al. |
| 6,657,538 B1 * | 12/2003 | Ritter .................. G06F 21/32 340/5.8 |
| 6,667,684 B1 | 12/2003 | Waggamon et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,775,655 B1 | 8/2004 | Peinado et al. |
| 6,804,825 B1 | 10/2004 | White et al. |
| 6,806,887 B2 | 10/2004 | Chernock et al. |
| 6,850,147 B2 | 2/2005 | Prokoski et al. |
| 6,853,988 B1 * | 2/2005 | Dickinson .................. G06F 21/32 380/277 |
| 6,873,975 B1 | 3/2005 | Hatakeyama et al. |
| 6,950,941 B1 | 9/2005 | Lee et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,983,882 B2 | 1/2006 | Cassone |
| 7,012,503 B2 | 3/2006 | Nielsen |
| 7,090,126 B2 | 8/2006 | Kelly et al. |
| 7,112,138 B2 | 9/2006 | Hedrick et al. |
| 7,137,012 B1 | 11/2006 | Kamibayashi et al. |
| 7,191,466 B1 | 3/2007 | Hamid et al. |
| 7,218,944 B2 | 5/2007 | Cromer et al. |
| 7,249,177 B1 | 7/2007 | Miller |
| 7,305,560 B2 | 12/2007 | Giobbi |
| 7,529,944 B2 | 5/2009 | Hamid |
| 7,574,734 B2 | 8/2009 | Fedronic et al. |
| 7,587,611 B2 | 9/2009 | Johnson et al. |
| 7,617,523 B2 | 11/2009 | Das et al. |
| 7,644,443 B2 | 1/2010 | Matsuyama et al. |
| 7,715,593 B1 | 5/2010 | Adams et al. |
| 7,883,417 B2 | 2/2011 | Bruzzese et al. |
| 7,904,718 B2 | 3/2011 | Giobbi et al. |
| 2001/0026619 A1 | 10/2001 | Howard et al. |
| 2001/0044337 A1 | 11/2001 | Rowe et al. |
| 2002/0007456 A1 | 1/2002 | Peinado et al. |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0023032 A1 | 2/2002 | Pearson et al. |
| 2002/0026424 A1 | 2/2002 | Akashi |
| 2002/0056043 A1 * | 5/2002 | Glass .................. G06F 21/32 713/179 |
| 2002/0071559 A1 | 6/2002 | Christensen et al. |
| 2002/0073042 A1 | 6/2002 | Maritzen et al. |
| 2002/0091646 A1 * | 7/2002 | Lake .................. G06Q 20/04 705/67 |
| 2002/0098888 A1 | 7/2002 | Rowe et al. |
| 2002/0103027 A1 | 8/2002 | Rowe et al. |
| 2002/0104006 A1 | 8/2002 | Boate et al. |
| 2002/0108049 A1 | 8/2002 | Xu et al. |
| 2002/0109580 A1 | 8/2002 | Shreve et al. |
| 2002/0116615 A1 | 8/2002 | Nguyen et al. |
| 2002/0129262 A1 | 9/2002 | Kutaragi et al. |
| 2002/0138767 A1 | 9/2002 | Hamid et al. |
| 2002/0140542 A1 | 10/2002 | Prokoski et al. |
| 2002/0144117 A1 | 10/2002 | Faigle |
| 2002/0150282 A1 | 10/2002 | Kinsella |
| 2002/0152391 A1 | 10/2002 | Willins et al. |
| 2002/0158750 A1 | 10/2002 | Almalik |
| 2002/0174348 A1 | 11/2002 | Ting |
| 2002/0178063 A1 | 11/2002 | Gravelle et al. |
| 2002/0191816 A1 | 12/2002 | Maritzen et al. |
| 2003/0036425 A1 | 2/2003 | Kaminkow et al. |
| 2003/0046552 A1 | 3/2003 | Hamid |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0079133 A1 | 4/2003 | Breiter et al. |
| 2003/0115474 A1 | 6/2003 | Khan et al. |
| 2003/0127511 A1 | 7/2003 | Kelly et al. |
| 2003/0139190 A1 | 7/2003 | Steelberg et al. |
| 2003/0149744 A1 | 8/2003 | Bierre et al. |
| 2003/0172037 A1 | 9/2003 | Jung et al. |
| 2003/0176218 A1 | 9/2003 | LeMay et al. |
| 2003/0186739 A1 | 10/2003 | Paulsen et al. |
| 2004/0123127 A1 | 6/2004 | Teicher et al. |
| 2004/0127277 A1 | 7/2004 | Walker et al. |
| 2004/0128162 A1 * | 7/2004 | Schlotterbeck et al. .......... 705/2 |
| 2004/0129787 A1 | 7/2004 | Saito et al. |
| 2004/0209690 A1 | 10/2004 | Bruzzese et al. |
| 2004/0209692 A1 | 10/2004 | Schober et al. |
| 2004/0215615 A1 | 10/2004 | Larsson et al. |
| 2004/0230488 A1 | 11/2004 | Beenau et al. |
| 2005/0054431 A1 | 3/2005 | Walker et al. |

(56) References Cited

U.S. PATENT DOCUMENTS

| | | | |
|---|---|---|---|
| 2005/0074126 A1* | 4/2005 | Stanko | 380/279 |
| 2005/0081040 A1 | 4/2005 | Johnson et al. | |
| 2005/0109836 A1 | 5/2005 | Ben-Aissa | |
| 2005/0229007 A1 | 10/2005 | Bolle et al. | |
| 2005/0251688 A1 | 11/2005 | Nanavati et al. | |
| 2005/0253683 A1 | 11/2005 | Lowe | |
| 2006/0022046 A1 | 2/2006 | Iwamura | |
| 2006/0058102 A1 | 3/2006 | Nguyen et al. | |
| 2006/0063575 A1 | 3/2006 | Gatto et al. | |
| 2006/0076401 A1 | 4/2006 | Frerking | |
| 2006/0113381 A1 | 6/2006 | Hochstein et al. | |
| 2006/0156027 A1 | 7/2006 | Blake | |
| 2007/0032288 A1 | 2/2007 | Nelson et al. | |
| 2007/0060319 A1 | 3/2007 | Block et al. | |
| 2007/0159301 A1 | 7/2007 | Hirt et al. | |
| 2007/0213048 A1 | 9/2007 | Trauberg | |
| 2007/0219926 A1 | 9/2007 | Korn | |
| 2007/0220272 A1 | 9/2007 | Campisi et al. | |
| 2008/0008359 A1 | 1/2008 | Beenau et al. | |
| 2008/0019578 A1 | 1/2008 | Saito et al. | |
| 2008/0188308 A1 | 8/2008 | Shepherd et al. | |
| 2009/0328182 A1 | 12/2009 | Malakapalli et al. | |
| 2010/0117794 A1 | 5/2010 | Adams et al. | |
| 2011/0126188 A1 | 5/2011 | Bernstein et al. | |
| 2013/0019295 A1* | 1/2013 | Park | H04L 9/3213 726/7 |
| 2013/0111543 A1* | 5/2013 | Brown | H04L 63/0884 726/1 |
| 2013/0276140 A1* | 10/2013 | Coffing | H04L 12/5895 726/27 |
| 2013/0331063 A1* | 12/2013 | Cormier | H04L 63/0272 455/411 |

FOREIGN PATENT DOCUMENTS

| | | |
|---|---|---|
| WO | WO 01/75876 | 10/2001 |
| WO | WO 01/77790 | 10/2001 |
| WO | WO 2005/050450 | 6/2005 |
| WO | WO 2005/086802 | 9/2005 |

OTHER PUBLICATIONS

Amr Farouk, Ahmed A. Abdelhafez, "Authentication Mechanisms in Grid Computing Environment: Comparative Study," IEEE, 2012, pp. 1-6.
Antonoff, Michael, "Visiting Video Valley," Sound & Vision, Nov. 2001, pp. 116, 118-119.
"Applying Biometrics to Door Access," Security Magazine, Sep. 26, 2002, Retrieved on Jan. 7, 2007, from <URL:http://www.securitymagazine.com/CDA/Articles/technologies/3ae610eaa34d8010VgnVCM100000f932a8c0_>, 5 pgs.
BioPay, LLC, "Frequently Asked Questions (FAQs) About BioPay," BioPay, LLC, 2007, Retrieved on Jan. 7, 2007, from <URL:http://www.biopay.com/faqs-lowes.asp>, 5 pgs.
Blum, Jonathan, "Digital Rights Management May Solver the Napster "Problem"," Technology Investor Industrysector, Oct. 2000, pp. 24-27.
Debow, Yvette, "Credit/Debit Debuts in Midwest Smart Card Test," Computers in Banking, v6, n11, Nov. 1989, 4 pgs.
Dennis, Sylvia, "Digital Passports Need Not Infringe Civil Liberties," Newsbytes, Dec. 2, 1999, 2 pgs.
Fasca, Chad, "The Circuit," Electronic News, vol. 45 Iss. 45, Nov. 8, 1999, 2 pgs.
"Firecrest Shows How Truly Commercially-Minded Companies Will Exploit the Internet," Computergram International, Jan. 18, 1996, 2 pgs.
Kontzer, Tony, "Thomson Bets on Smart Cards for Video Encryption," www.informationweek.com, Jun. 7, 2001, 1 pg.
Lake, Matt, "Downloading for Dollars," Sound & Vision, Nov. 2000, pp. 137-138.
Lewis, Peter H., "Sony and Visa in On-Line Entertainment Venture," New York Times, v145, Nov. 16, 1995, 1 pg.
McIver, R. et al., "Identification and Verification Working Together," Bioscrypt, Aug. 27, 2004, Retrieved on Jan. 7, 2007, from <URL:http://www.ibia.org/membersadmin/whitepapers/pdf/15/Identification%20and%20 Verification%20Working%20Together.pdf>, 5 pgs.
"Micronas and Thomson Multimedia Showcase a New Copy Protection System that Will Drive the Future of Digital Television," www.micronas.com, Jan. 8, 2002, 3 pgs.
Nilsson, J. et al., "Match-On-Card for Java Cards," Precise Biometrics, White Paper, Apr. 2004, Retrieved on Jan. 7, 2007, from <URL:http://www.ibia.org/membersadmin/whitepapers/pdf/17/Precise%20Match-on-Card%20for%20Java%20Cards.pdf>, 5 pgs.
Nordin, B., "Match-On-Card Technology," Precise Biometrics, White Paper, Apr. 2004, Retrieved on Jan. 7, 2007, from <URL:http://www.ibia.org/membersadmin/whitepapers/pdf/17/Precise%Match-on-Card%20technology.pdf>, 7 pgs.
Paget, Paul, "The Security Behind Secure Extranets," Enterprise Systems Journal, Dec. 1999, 4 pgs.
PCT International Search Report, PCT/US04/38124, Apr. 7, 2005, 10 pgs.
PCT International Search Report, PCT/US05/43447, Feb. 22, 2007, 7 pgs.
PCT International Search Report, PCT/US05/46843, Mar. 1, 2007, 10 pgs.
PCT International Search Report, PCT/US07/11102, Oct. 3, 2008, 11 pgs.
PCT International Search Report, PCT/US07/11103, Apr. 23, 2008, 9 pgs.
PCT International Search Report, PCT/US07/11104, Jun. 26, 2008, 9 pgs.
PCT International Search Report, PCT/US07/11105, Oct. 20, 2008, 10 pgs.
Pope, "Oasis Digital Signature Services: Digital Signing without the Headaches," Internet Computing—IEEE, vol. 10, Oct. 2006, pp. 81-84.
"SAFModuleTM: A Look Into Strong Authentication," saflink Corporation, Retrieved on Jan. 7, 2007, from <URL:http://www.ibia.org/membersadmin/whitepapers/pdf/6/SAFmod_WP.pdf>, 8 pgs.
Sapsford, Jathon, "E-Business: Sound Waves Could Help Ease Web-Fraud Woes," Wall Street Journal, Aug. 14, 2000, 2 pgs.
"Say Hello to Bluetooth," Bluetooth Web site, Jun. 2000, 4 pgs.
"Smart Cards and Biometrics White Paper," Smart Card Alliance, May 2002, Retrieved on Jan. 7, 2007, from <URL: http://www.securitymanagement.com/library/smartcard_faqtech0802.pdf>, 7 pgs.
"Thomson Multimedia Unveils Copy Protection Proposal Designed to Provide Additional Layer of Digital Content Security," www.thompson-multimedia.com, May 30, 2001, 2 pgs.
Van Winkle, William, "Bluetooth, the King of Connectivity," Laptop Buyer's Guide and Handbook, Jan. 2000, pp. 148-153.
Wade, Will, "Using Fingerprints to Make Payments at POS Slowly Gaining Popularity," Credit Union Journal, International Biometric Group, Apr. 21, 2003, Retrieved on Jan. 7, 2007, from <URL:http://www.biometricgroup.com/in_the_news/04.21.03.html>, 3 pgs.
Wallace, Bob, "The Internet Unplugged," InformationWeek.com, Dec. 13, 1999, pp. 22-24.
Weber, Thomas E., "In the Age of Napster, Protecting Copyright is a Digital Arms Race," Wall Street Journal, Jul. 24, 2000, 3 pgs.
"What is a File?," Apr. 30, 1998, URL: http://unixhelp.ed.ac.uk/editors/whatisafile.html, accessed Mar. 11, 2010 via http://waybackmachine.org/1998061500000* /http://unixhelp.ed.ac.uk/editors/whatisafile.html, 1 pg.
Yoshida, Junko, "Content Protection Plan Targets Wireless Home Networks," www.eetimes.com, Jan. 11, 2002, 2 pgs.
Simon Liu and Mark Silverman. 2001. "A Practical Guide to Biometric Security Technology". IT Professional 3, 1 (Jan. 2001). 27-32. DOI=10. 1109/6294.899930 http://dx.doi.org/10.1109/6294.899930.
Smart Card Alliance Report, "Contactless Technology for Secure Physical Access: Technology and Standards Choices", Smart Card Alliance, Oct. 2002, p. 1-48.

* cited by examiner

BIOMETRIC PERSONAL DATA KEY (PDK) AUTHENTICATION

CROSS-REFERENCE TO RELATED APPLICATIONS

The present application claims priority, under 35 U.S.C. §120, to U.S. patent application Ser. No. 13/710,109 filed Dec. 10, 2012 and entitled "Biometric Personal Data Key (PDK) Authentication" which claims priority to U.S. patent application Ser. No. 11/314,199, filed Dec. 20, 2005 and entitled "Biometric Personal Data Key (PDK) Authentication," which claims the benefit of U.S. Provisional Application No. 60/637,538, filed on Dec. 20, 2004, and of U.S. Provisional Application No. 60/652,765, filed on Feb. 14, 2005, the entire contents of which are hereby incorporated by reference.

FIELD OF THE INVENTION

The present invention relates generally to computerized authentication, and more specifically, to an authentication responsive to biometric verification of a user being authenticated.

BACKGROUND

Conventional user authentication techniques are designed to prevent access by unauthorized users. One technique is to require a user being authenticated to provide secret credentials, such as a password, before allowing access. Similarly, a PIN number can be required by an ATM machine before allowing a person to perform automated bank transactions. A difficulty with this technique is that it requires the user to memorize or otherwise keep track of the credentials. A uses often has multiple sets of credentials (e.g., passwords and PINs) and it can be quite difficult to keep track of them all.

Another technique that does not require the user to memorize credentials is to provide the user with an access object such as a key (e.g., an electronic key) that the user can present to obtain access. For example, a user can be provided with a small electronic key fob that allows access to a building or other secured location. A difficulty with using access objects is that authentication merely proves that the access object itself is valid; it does not verify that the legitimate user is using the access object. That is, illegitimate user can use a stolen access object to enter a secured location because the user's identity is never checked.

Some hybrid authentication techniques require the user to provide both an access object and credentials. The user is authenticated only upon providing both items. Of course, this solution does not resolve the problem of making the user memorize credentials.

Therefore, there is a need for systems and methods for verifying a user that is being authenticated that does not suffer from the limitations described above. Moreover, the solution should ease authentications by wirelessly providing an identification of the user.

SUMMARY

The present invention addresses the above needs by providing systems and methods for authentication responsive to biometric verification of a user being authenticated. In one embodiment, an integrated device includes a persistent storage to persistently stores a code such as a device identifier (ID) and biometric data for a user in a tamper-resistant format, and a verification module, in communication with the persistent storage, to receive scan data from a biometric scan for comparison against the biometric data, and if the scan data matches the biometric data, wirelessly sending a code for authentication.

In one embodiment, a method for verifying a user during authentication of an integrated device, includes persistently storing biometric data for the user in a tamper-resistant format; responsive to receiving a request for biometric verification of the user, receiving scan data from a biometric scan; comparing the scan data to the biometric data to determine whether the data match; and responsive to a determination that the scan data matches the biometric data, wirelessly sending a code for authentication.

Other embodiments include corresponding systems, apparatus, and computer programming products, configured to perform the actions of the methods, encoded on computer storage devices. These and other embodiments may each optionally include one or more of the following features. For instance the operations further include registering an age verification for the user in association with the code. For instance the operations further include establishing a secure communication channel prior to sending the code for authentication. For instance the operations further include receiving a request for the code without a request for biometric verification, and responsive to receiving the request for the code without a request for biometric verification, sending the code without requesting the scan data. For instance, the features include: the code is registered with a trusted authority, and the code can be authenticated to a third party by the trusted authority; the code uniquely identifies the integrated device; the code indicates that the biometric verification was successful; persistently storing biometric data includes permanently storing biometric data; the biometric data and the scan data are both based on a fingerprint scan by the user, an LED to be activated for requesting the biometric scan.

In one embodiment, a method for authenticating a verified user, includes receiving a code associated with a biometrically verified user; requesting authentication of the code; receiving an authentication result; and in response to the authentication result being positive, providing access to an application.

In one embodiment, a system includes an integrated device (e.g. a biometric key) to store biometric data for a user in a tamper resistant format, and if scan data can be verified as being from the user by comparing the scan data to the biometric data, wirelessly sending a code; and an authentication module to receive the code and send the code to a trusted authority for authentication, and responsive to the code being authenticated, allowing the user to access an application.

Other embodiments include corresponding systems, apparatus, and computer programming products, configured to perform the actions of the methods, encoded on computer storage devices. These and other embodiments may each optionally include one or more of the following features. For instance, the operations further include registering the code with a trusted authority, wherein requesting authentication of the code includes providing the code to the trusted authority and wherein receiving an authentication result comprises receiving the authentication result from the trusted authority. For instance the operations further include registering a date of birth or age with the trusted authority. For instance the operations further include establishing a secure communications channel with an integrated device, wherein the code associated with the biometrically verified user is received from the integrated device. For instance the features include: the integrated device receives an authentication request from the authentication module, and in response, requests a biometric scan from the user to generate the scan data; when the integrated device cannot verify the scan data as being from the user, it does not send the code.

Advantageously, user authentication is bolstered with highly reliable biometric verification of the user in an integrated device. Furthermore, a keyless environment relieves authorized users from having to memorize credentials, and of having to physically enter credentials or keys. In addition, the integrated device can be authenticated for an application that is open to the public (i.e., in an open loop system).

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying drawings.

DETAILED DESCRIPTION

Systems and methods for authentication responsive to biometric verification of a user being authenticated are described. Generally, biometric verification uses biometric data to ensure that the user of, for example, a biometric key, is the person registered as an owner. Biometric data is a digital or analog representation of characteristics unique to the user's body. For example, a fingerprint of a subject can be compared against previously-recorded biometric data for verification that the subject is the registered owner of the biometric key. Then, the biometric key itself can be authenticated.

Although the embodiments below are described using the example of biometric verification using a fingerprint, other embodiments within the spirit of the present invention can perform biometric verification using other types of biometric data. For example, the biometric data can include a palm print, a retinal scan, an iris scan, hand geometry recognition, facial recognition, signature recognition, or voice recognition.

Figure 1:
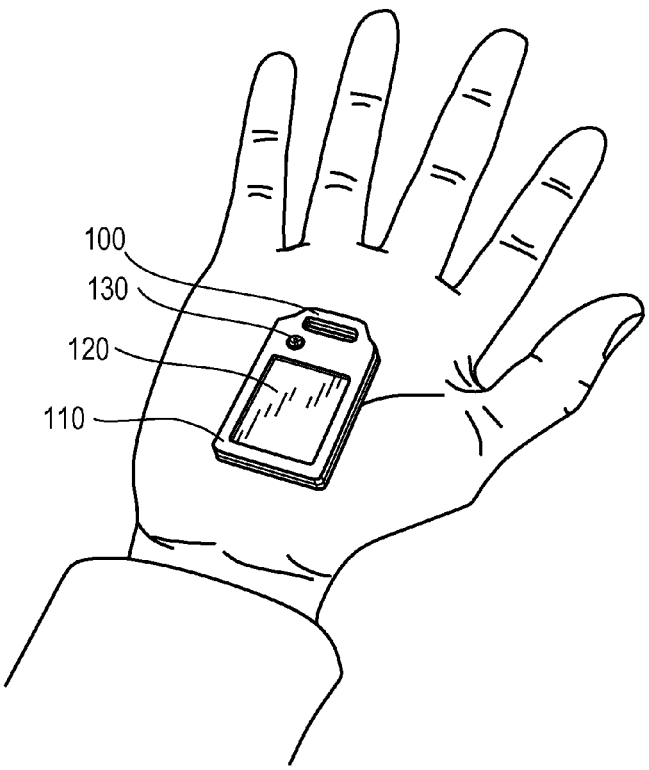
FIG. 1 is a schematic diagram illustrating a biometric key for providing authentication information for a biometrically verified user according to one embodiment of the present invention.

FIG. 1 is a schematic diagram illustrating an example of a biometric key 100 for providing authentication information for a biometrically verified user according to one embodiment of the present invention. In one embodiment, the biometric key 100 comprises a frame 110, a scan pad 120, and an LED 130. In one embodiment, biometric key 100 has a small form factor (e.g., the size of an automobile remote control) such that it can be unobtrusively carried by a user. In one embodiment, the biometric key 100 is integrated into another object or device. A device having an integrated biometric key 100 is occasionally referred to herein as an "integrated device." For example, in one embodiment, the biometric key 100 is integrated into a mobile phone (e.g. a cellular phone or smartphone), tablet, laptop, mp3 player, mobile gaming device, watch, key fob or other mobile device, thereby making the biometric key 100 unobtrusive to carry.

Frame 110 can be formed by plastic, metal or another suitable material. Frame 110 is shaped to secure scan pad 120, and includes a perforation for attachment to, for example a key chain or clip. In one embodiment, frame 110 is formed from a unitary molding to protect biometric data. Accordingly, frame 110 cannot be opened to expose the underlying components unless it is broken.

Scan pad 120 can be, for example, an optical scanner using a charge coupled device, or a capacitive scanner. Scan pad 120 can be sized to fit a thumb or other finger. Biometric key 100 of the present embodiment includes LED 130 that lights up to request a fingerprint scan from a user. In one embodiment, LED 130 can also confirm that user verification and/or authentication has completed.

Biometric key 100 can authenticate a user for various purposes. For example, biometric key 100 can allow keyless entry into homes and autos. In another example, biometric key 100 can log a user onto a computer system or point of sale register without typing in credentials. In still another example, biometric key 100 can verify that an enrolled user is above a certain age (e.g., before allowing access to a slot machine in a casino). In some embodiments, biometric key 100 operates without biometric verification, and request a fingerprint scan from a user only when biometric verification is needed for the particular use.

Figure 2:
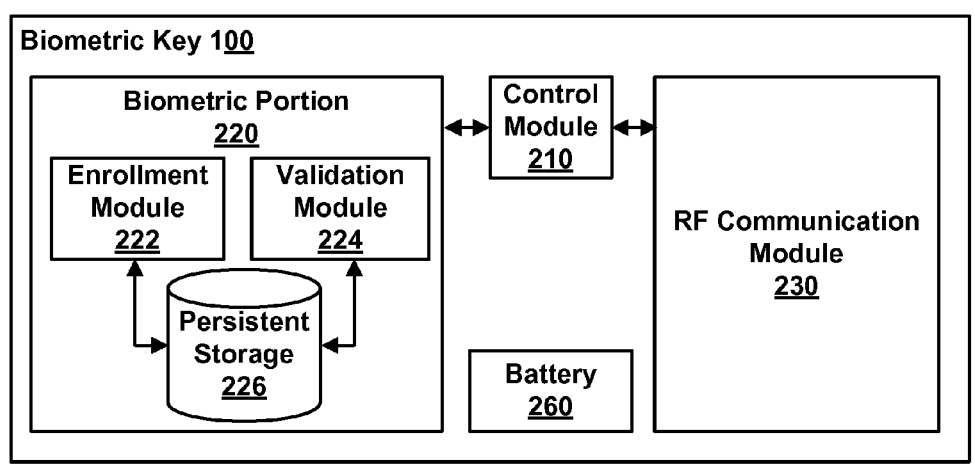
FIG. 2 is a block diagram illustrating functional modules within the biometric key according to one embodiment of the present invention.

FIG. 2 is a block diagram illustrating biometric key 100 according to one embodiment of the present invention. Biometric key 100 comprises control module 210, biometric portion 220, RF communication module 230, persistent storage 240, and battery 250. Biometric key 100 can be formed from a combination of hardware and software components as described above. In one embodiment, biometric key 100 comprises a modified key fob.

Control module 210 coordinates between several functions of biometric key 100. In one embodiment, control module 210 provides a verification code upon successful verification of the user. More specifically, once biometric portion 220 indicates that a fingerprint scan matches biometric data that was collected during enrollment, control module 210 can trigger RF communication module 230 for sending a code indicating that the user was verified. In another embodiment, control module 210 can work in the opposite direction by detecting a request for verification from RF communication module 230, and then requesting verification of the user from biometric portion 210. Note that control module 210 of FIG. 2 is merely a grouping of control functions in a central architecture, and in other embodiments, the control functions can be distributed between several modules around biometric key 100.

Biometric portion 220 comprises enrollment module 222, validation module 224, and biometric data base 226. In one embodiment, enrollment module 222 registers a user with biometric key 100 by persistently storing biometric data associated with the user. Further, enrollment module 222 registers biometric key 100 with a trusted authority by providing the code (e.g., device ID) to the trusted authority. Or conversely, the trusted authority can provide the code to biometric key 100 to be stored therein.

Validation module 224 can comprise scan pad 120 (FIG. 1) to capture scan data from a user's fingerprint (e.g., a digital or analog representation of the fingerprint). Using the scan data, validation module 214 determines whether the user's fingerprint matches the stored biometric data from enrollment. Conventional techniques for comparing fingerprints can be used. For example, the unique pattern of ridges and valleys of the fingerprints can be compared. A statistical model can be used to determine comparison results. Validation module 224 can send comparison results to control module 210.

In other embodiments, validation module 224 can be configured to capture biometric data for other human characteristics. For example, a digital image of a retina, iris, and/or handwriting sample can be captured. In another example, a microphone can capture a voice sample.

Persistent storage 226 persistently stores biometric data from one or more users which can be provided according to specific implementations. In one embodiment, at least some of persistent storage 226 is a memory element that can be written to once but cannot subsequently be altered. Persistent storage 226 can include, for example, a ROM element, a flash memory element, or any other type of non-volatile storage element. Persistent storage 226 is itself, and stores data in, a tamper-proof format to prevent any changes to the stored data. Tamper-proofing increases reliability of authentication because it does not allow any changes to biometric data (i.e., allows reads of stored data, but not writes to store new data or modify existing data). Furthermore, data can be stored in an encrypted form.

In one embodiment, persistent storage 226 also stores the code that is provided by the key 100 responsive to successful verification of the user. As described above, in one embodiment the code is a device ID or other value that uniquely identifies biometric key 100. In one embodiment, the code is providing during the manufacturing process and the biometric data are provided during an enrollment of the user. In other embodiments, the code is provided during enrollment and/or the biometric data are provided during manufacturing. Further, in some embodiments persistent storage 226 stores other data utilized during the operation of biometric key 100. For example, persistent storage 226 can store encryption/decryption keys utilized to establish secure communications links.

Radio frequency (RF) communication module 230 is, for example, a transceiver or other mechanism for wireless communication. RF communication module 230 can send and receive data (e.g., the code) as modulated electromagnetic signals. In one embodiment, RF communication 220 can be optimized for low-power usage by, for example, using short-range transceivers. RF communication module 230 can actively send out connection requests, or passively detect connection requests.

Battery 260 can be a conventional power source suitable for the components of biometric key 100. Battery 260 can be either replaceable or rechargeable. Alternatively, battery 260 can be embedded within key 100 such that the key must be discarded or recycled upon expiration of the battery.

Figure 3:
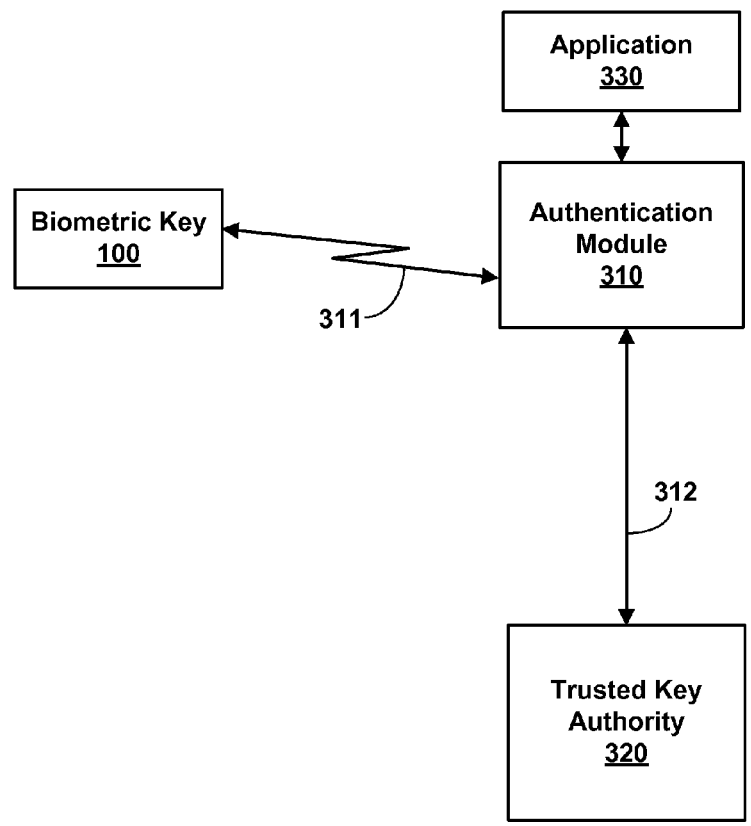
FIG. 3 is a block diagram illustrating a system for providing authentication information for a biometrically verified user.

FIG. 3 is a block diagram illustrating a system 300 for providing authentication information for a biometrically verified user. System 300 comprises an authentication module 310 in communication with biometric key 100, a trusted key authority 320, and an application 330.

Authentication module 310 is coupled in communication with biometric key via line 311 (i.e., a wireless medium such as EM signals), and with trusted key authority 320 via line 312 (e.g., a secure data network such as the Internet, or a cell network). Authentication module 310 can include one or more of, for example, a computerized device, software executing on a computerized device, and/or a reader/decoder circuit. In one embodiment, authentication module 310 servers as a gatekeeper to application 330 by requiring the code indicating successful biometric verification of the user prior to allowing access to the application. Further, in one embodiment, authentication module 310 provides the code to trusted key authority 320 in order to verify that it belongs to a legitimate key (e.g., when application 330 is security-critical). Authentication module 310 can send a message to application 330, or otherwise allow access to the application, responsive to a successful authentication by trusted key authority 320.

Application 330 is a resource that can be accessed by a verified and authenticated user. Application 330 can be, for example, a casino machine, a keyless lock, a garage door opener, an ATM machine, a hard drive, computer software, a web site, a file, a financial account (e.g. a savings account, checking account, brokerage account, credit card account, credit line, etc.) and the like. In one embodiment, a file includes medical information such as a medical record, insurance information or other healthcare information. Application 330 can execute on the same system as authentication module 310 or on another system in communication with the system of the authentication module. In one embodiment, application module 330 allows access by a user after receiving a message from authentication module 310. At that point, application 330 can allow direct use by the user, or require that communications continue to pass through authentication module 310 for continued authentication.

Trusted key authority 320 is a third-party authority that is present in some embodiments in order to provide enhanced security. In one embodiment, trusted key authority 320 verifies that a code from a biometric key is legitimate. To do so, the trusted key authority 320 stores a list of codes for legitimate biometric keys. The list can be batched or updated each time a new user/key is enrolled. In one embodiment, trusted key authority 320 can also store a profile associated with a biometric key. The profile describes the user associated with the key, the key itself, the trusted key authority, and/or other relevant information. In one embodiment, the functionality of trusted key authority 320 is provided by a server or other computerized device.

In an open system, where unknown users can attempt authentication (e.g., in a public grocery store), trusted key authority 320 provides verification that a key presenting a certain code is legitimate. By contrast, in a closed system, only known users are legitimate (e.g., owners of a home), the trusted key authority 320 can be maintained locally and serves to verify that the key belongs to one of the limited number of users that can use the system.

Figure 4:
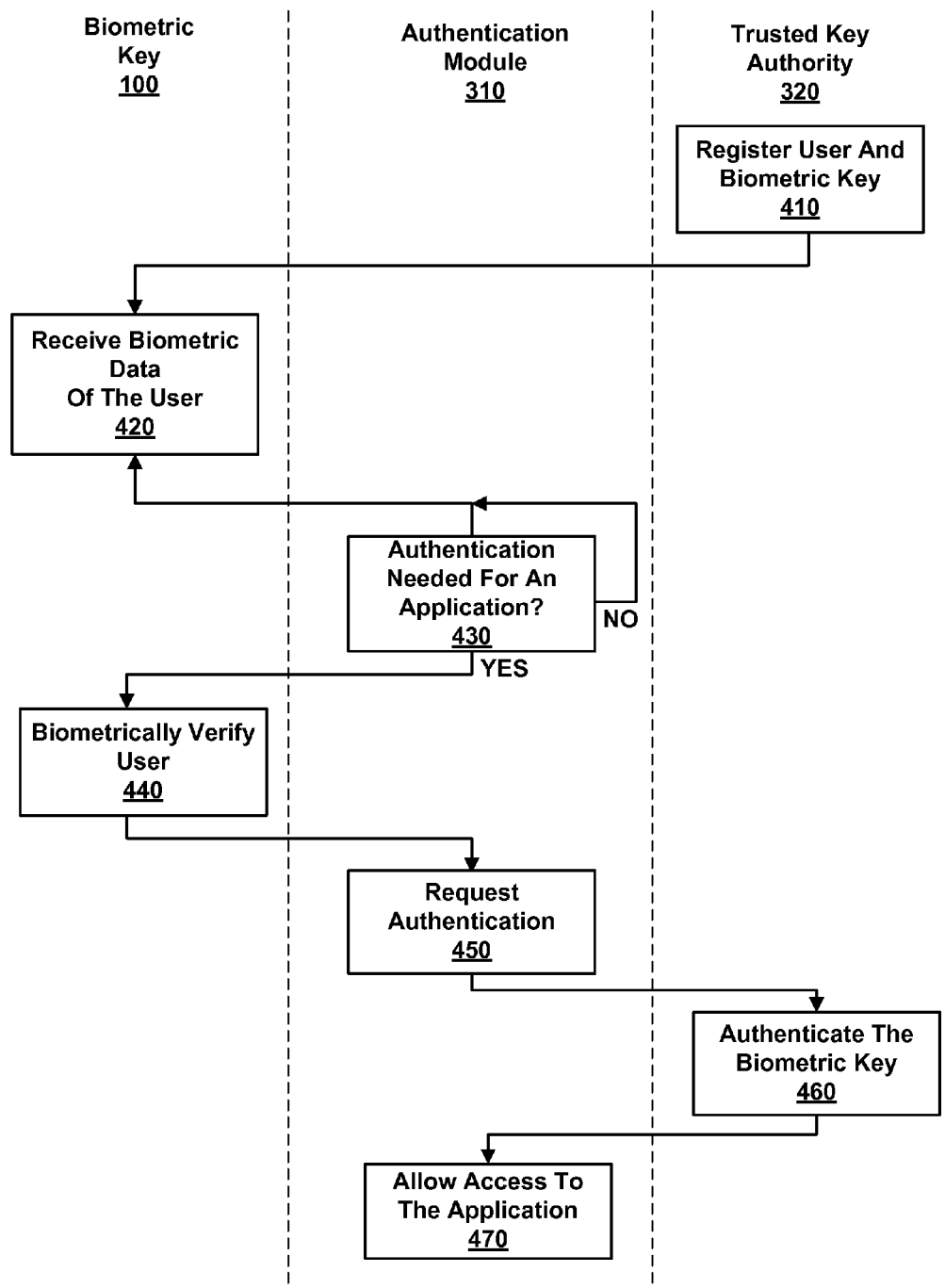
FIG. 4 is a flow chart illustrating a method for providing authentication information for a biometrically verified user.

FIG. 4 is a flow chart illustrating a method 400 for authenticating a biometrically verified user using a trusted key authority (e.g., authority 320). A biometric key (e.g., biometric key 100) is registered 410 with the trusted key authority. The code (e.g., device ID) of the key is stored by the trusted key authority. Additionally, a user is enrolled 420 with the biometric key as described below with reference to FIG. 5.

In various situations, authentication of the key is needed 430 (e.g., by authentication module 310). In one embodiment, authentication can be required prior to allowing access to an application (e.g., application 330). For example, a user can be standing proximate to a slot machine in a casino which requires that a user be over the age of 21. The slot machine can detect the biometric key in the user's pocket, and, in response, spawn a conspicuous pop-up window on the slot machine requesting age verification. Alternatively, the biometric key can blink an LED. In other embodiments, biometric verification is not necessary and only the key itself is authenticated.

The biometric key establishes communication with the authentication module using various techniques. In one embodiment, the key and authentication module engage in preliminary data exchanges to determine who and/or what they are (e.g., to ascertain that they belong to the same system). These data exchanges can include challenge-response dialogs, hashing algorithms, and the like in order to ensure that the biometric key and authentication module are themselves legitimate. Further, in one embodiment the key and authentication module establish a secure communications channel. The key performs the biometric verification of the user 440 as described below with reference to FIG. 6. If the biometric verification of the user is successful, the key provides its code over the secure communications channel.

The code is utilized to authenticate the biometric key itself 450, 460 as described below with reference to FIG. 7 and profile information is received. Responsive to successful authentication of the key, access is allowed 470 to the application. In the slot machine example, a new pop-up window can be spawned to indicate a successful age verification.

Figure 5:
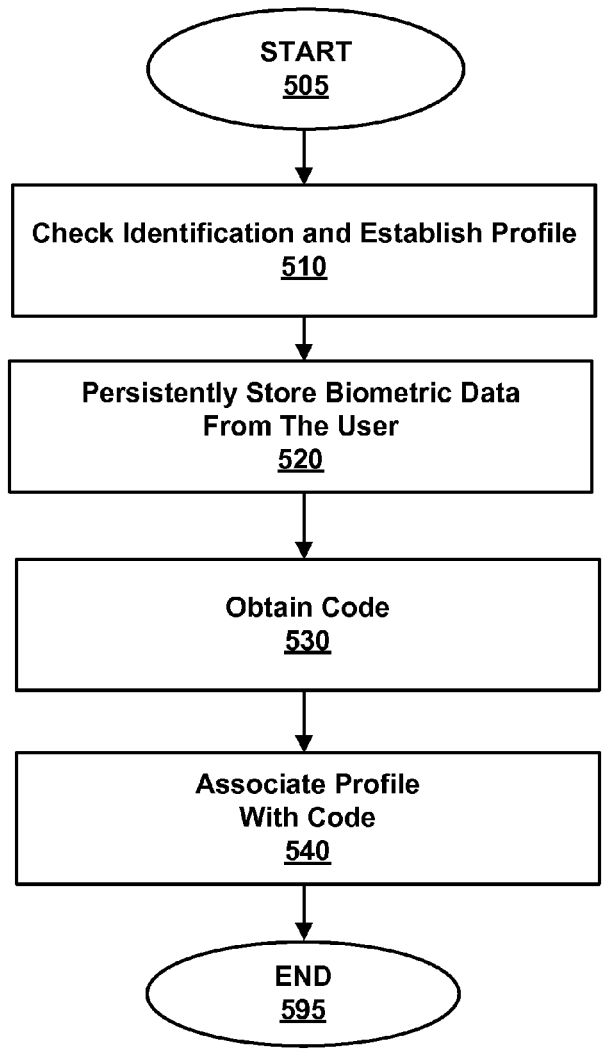
FIG. 5 is a flow chart illustrating a method for enrolling biometric data of the user with the biometric key.

FIG. 5 is a flow chart illustrating a method 500 for enrolling biometric data of the user with the biometric key according to one embodiment of the present invention. An agent checks 510 an identification of the user and establishes a profile. The agent can be, for example, a government official, a notary, and/or an employee of a third party which operates the trusted key authority, or another form of witness. The agent can follow standardized procedures such as requiring identification based on a state issued driver license, or a federally issued passport in order to establish a true identity of the user.

The profile describes the user and can include, for example, the user's name, date of birth, age, passwords, account numbers, preferences etc. In some embodiments, the profile stores no or only limited information about the user. For example, the agent might store the date of birth of the user in the profile, but not store any other information about the user. In addition, the profile describes the biometric key and/or key authority. For the biometric key, the profile can store a value indicating the status of the key, such as whether the key is in-service, out-of-service, abandoned, lost, stolen etc. For the key authority, the profile can store a value identifying the key authority.

The agent also collects and persistently stores 520 biometric data from the user. To do so, a fingerprint or eye retina can be scanned and converted to data which is then persistently stored in the biometric key. In one embodiment, the agent does not retain the biometric data. Since this step occurs under control of the agent, the agent can be certain that the biometric data stored within the key matches the user who presented the identification. The agent also obtains the code (e.g., device ID) from the biometric key in which the biometric data was stored. The agent associates the code and the profile using a table and/or other data structure.

Figure 6:
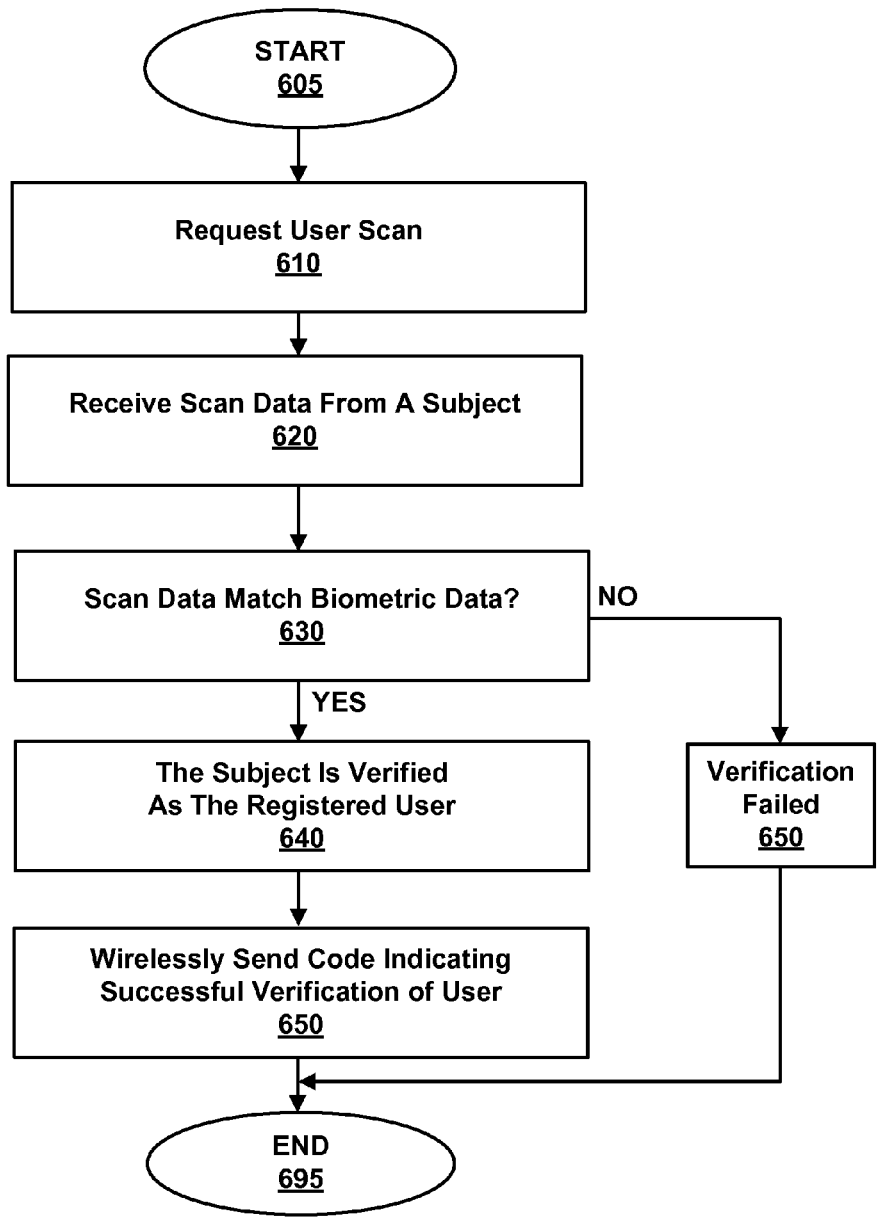
FIG. 6 is a flow chart illustrating a method for verifying a subject presenting the biometric key according to one embodiment of the present invention.

FIG. 6 is a flow chart illustrating a method 600 for verifying a subject presenting the biometric key according to one embodiment of the present invention. In response to an authentication request, a user scan is requested 610 (e.g., by a blinking LED). Once the subject provides a fingerprint, scan data is received 620. Scan data is compared for a match 630 to previously-stored biometric data. If there is no match, then verification fails 650.

If there is a match, the subject is verified 640 as the user. The code indicating a successful verification is wirelessly sent 650 from the biometric key (e.g., by RF communication module 230).

Figure 7:
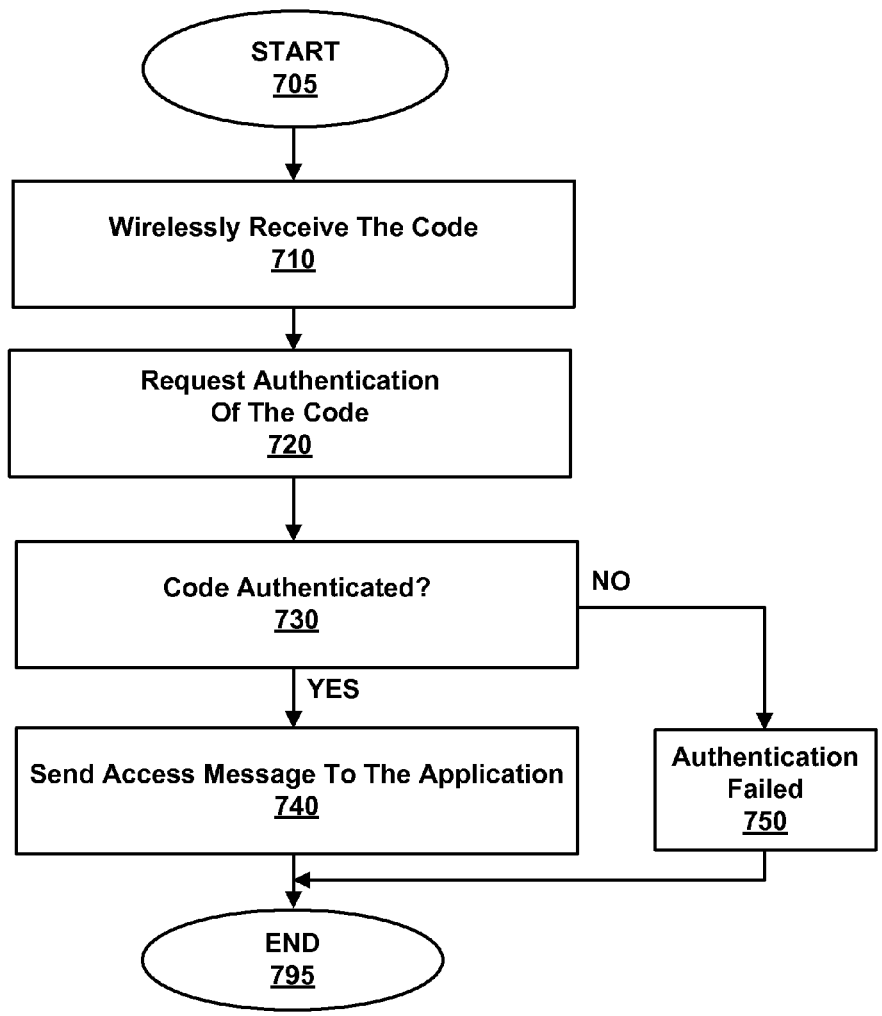
FIG. 7 is a flow chart illustrating a method for authenticating a verified user of the biometric key according to one embodiment of the present invention.

FIG. 7 is a flow chart illustrating a method 700 for authenticating a biometric key according to one embodiment of the present invention. The code is wirelessly received 710. A request for authentication of the code is sent to the trusted key authority 720. The trusted key authority determines whether the code is authentic 730 (i.e., it was created through an established enrollment process) and has a valid status (e.g., has not expired). If authentication is successful, the trusted key authority sends an access message to the application to allow user access and/or provide additional information from the profile 740 (such as the user's age). If authentication is not successful, authentication fails 750 and the message to the application indicates that the user should be denied access.

In some embodiments, the biometric key provides multiple codes and/or other data values. For example, the key can provide a device ID code that the authentication module can provide to the trusted key authority in order to authenticate the key, and the key can provide a secret decryption value that can be used to communicate with the biometric key. As used herein, the term "code" is intended to include one or more of these values, depending upon the specific embodiment.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description below. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method comprising:
   persistently storing biometric data of a legitimate user and an ID code on an integrated device;
   responsive to receiving a request for a biometric verification of a user, receiving, from a biometric sensor, scan data from a biometric scan performed by the biometric sensor;
   comparing the scan data to the biometric data to determine whether the scan data matches the biometric data;
   responsive to a determination that the scan data matches the biometric data, wirelessly sending the ID code for comparison by a third-party trusted authority against one or more previously registered ID codes maintained by the third-party trusted authority; and
   responsive to receiving an access message from the third-party trusted authority-indicating that the third-party trusted authority successfully authenticated the ID code, allowing the user to complete a financial transaction.

2. The method of claim 1, further comprising:
   registering an age verification for the user in association with the ID code.

3. The method of claim 1, wherein an indication that the biometric verification was successful is sent with the ID code.

4. The method of claim 1, wherein the biometric data includes data from one or more of a fingerprint, palm print, a retinal scan, an iris scan, a hand geometry, a facial recognition, a signature recognition and a voice recognition.

5. The method of claim 1, wherein the integrated device comprises one or more of a mobile phone, tablet, laptop, mp3 player, mobile gaming device, watch and a key fob.

6. The method of claim 1, wherein completing the financial transaction includes accessing an application.

7. The method of claim 1, wherein completing the financial transaction includes accessing one or more of a casino machine, a keyless lock, an ATM machine, a web site, a file and a financial account.

8. The method of claim 1, further comprising:
   responsive to determining the action does not require biometric verification, receiving a request for the ID code without a request for biometric verification; and
   responsive to receiving the request for the ID code without a request for biometric verification, sending the ID code for authentication without requesting the scan data.

9. An integrated device comprising:
   a persistent storage media that persistently stores biometric data of a user and an ID code;
   a validation module, coupled to communicate with the persistent storage media, that receives scan data from a biometric scan for comparison against the biometric data, and that sends the ID code for comparison by a third-party trusted authority against one or more previously registered ID codes maintained by the third-party trusted authority; and
   a radio frequency communication module that receives an access message from the third-party trusted authority indicating that the third-party trusted authority successfully authenticated the ID code sent to the third-party trusted authority based on the comparison of the ID code and allowing the user to—complete a financial transaction.

10. The integrated device of claim 7, wherein the ID code is transmitted to the third-party trusted authority over a network.

11. The integrated device of claim 7, wherein an age verification is registered in association with the ID code.

12. The integrated device of claim 7, wherein the integrated device comprises one or more of a mobile phone, tablet, laptop, mp3 player, mobile gaming device, watch and a key fob.

13. A system, comprising:
an integrated hardware device that persistently stores biometric data of a legitimate user and an ID code in the integrated hardware device, and that wirelessly sends the—ID code; an authentication circuit that receives the ED code and sends the ID code to a third-party trusted authority for authentication, and that receives an access message from the third-party trusted authority indicating that the third-party trusted authority successfully authenticated the ID code and allows the user to complete a financial transaction; and
the third-party trusted authority operated by a third party, the third-party trusted authority storing a list of legitimate codes and determining the authentication of the ID code received based on a comparison of the ID code received and the legitimate codes included in the list of the legitimate codes.

14. The system of claim 11 wherein the integrated hardware device receives an authentication request from the authentication circuit, and in response, requests a biometric scan from a user to generate scan data and, when the integrated hardware device cannot verify the scan data as being from the legitimate user, the integrated hardware device does not send the ID code.

15. The system of claim 11, wherein the integrated hardware device comprises one or more of a mobile phone, tablet, laptop, mp3 player, mobile gaming device, watch and a key fob.

16. The system of claim 11, wherein the biometric data includes data based on one or more of a fingerprint, palm print, a retinal scan, an iris scan, a hand geometry, a facial recognition, a signature recognition and a voice recognition.

17. The system of claim 11, wherein completing the financial transaction includes accessing one or more of a casino machine, a keyless lock, an ATM machine, a web site, a file and a financial account.

18. The system of claim 11, wherein completing the financial transaction includes accessing an application.

* * * * *